US012763372B2

(12) United States Patent
Krause et al.

(10) Patent No.: US 12,763,372 B2
(45) Date of Patent: Oct. 13, 2026

(54) CHEMICAL ADDITIVES FOR LIQUEFIED GAS ELECTROLYTES

(71) Applicant: SOUTH 8 TECHNOLOGIES, INC., San Diego, CA (US)

(72) Inventors: Frederick Krause, Carlsbad, CA (US); Jeremy Intrator, San Diego, CA (US); Cyrus S Rustomji, San Diego, CA (US)

(73) Assignee: SOUTH 8 TECHNOLOGIES, INC.

( * ) Notice: Subject to any disclaimer, the term of this patent is extended or adjusted under 35 U.S.C. 154(b) by 0 days.

(21) Appl. No.: 19/220,824

(22) Filed: May 28, 2025

(65) Prior Publication Data

US 2025/0372719 A1 Dec. 4, 2025

Related U.S. Application Data

(60) Provisional application No. 63/652,616, filed on May 28, 2024.

(51) Int. Cl.
*H01M 10/0525* (2010.01)
*H01M 10/0569* (2010.01)

(52) U.S. Cl.
CPC ... *H01M 10/0569* (2013.01); *H01M 10/0525* (2013.01)

(58) Field of Classification Search
CPC ...................... H01M 10/0525; H01M 10/0569
See application file for complete search history.

(56) References Cited

U.S. PATENT DOCUMENTS

2013/0280618 A1* 10/2013 Shinmei ................. H01G 11/56 429/188
2018/0375156 A1 12/2018 Zhamu et al.
2019/0198933 A1* 6/2019 Newhouse .............. H01M 4/13
2020/0185777 A1 6/2020 Rustomji et al.
2023/0024358 A1* 1/2023 Kim ...................... H01M 4/625
2023/0327090 A1* 10/2023 Li ....................... H01M 4/5825 429/224
2023/0327206 A1 10/2023 Rustomji et al.

OTHER PUBLICATIONS

International Search Report for PCT/US2025/031178 dated Jul. 7, 2025 (6 pages).

* cited by examiner

*Primary Examiner* — Osei K Amponsah
(74) *Attorney, Agent, or Firm* — Manuel de la Cerra

(57) ABSTRACT

An electrochemical device is disclosed that includes an ionically conducting electrolyte, a first electrode and a second electrode. The electrodes are in contact with the ionically conducting electrolyte, and a housing encloses the electrodes and the ionically conducting electrolyte. The ionically conducting electrolyte comprises a liquefied gas solvent, an ester solvent, and a salt. The liquefied gas solvent has a vapor pressure above 100 kPa at a temperature of 293.15K. The salt and ester are soluble in the liquefied gas solvent such that the ionically conducting electrolyte is a liquid under pressure.

10 Claims, 3 Drawing Sheets

$R,R' = C_nH_{2n+1-x}F_x$ $R'' = C_nH_{2n-x}F_x$

CHEMICAL ADDITIVES FOR LIQUEFIED GAS ELECTROLYTES

CROSS-REFERENCE TO RELATED APPLICATIONS

This application claims priority to U.S. Application 63/652,616 filed on May 28, 2024, the entire contents of which are incorporated by reference.

This application is also related to the following applications and patents, each of which is hereby incorporated by reference in its entirety: U.S. Pat. No. 10,608,284 issued on Mar. 31, 2020; U.S. Pat. No. 10,998,143 issued on May 4, 2021; U.S. Pat. No. 10,784,532 issued on Sep. 22, 2020; U.S. Pat. No. 11,088,396 issued on Aug. 10, 2021; U.S. Pat. No. 10,873,070 issued on Dec. 22, 2020; U.S. Pat. No. 11,342,615 issued on May 24, 2022; U.S. Pat. No. 11,049,668 issued on Jun. 29, 2021; U.S. Pat. No. 11,342,615 issued on May 24, 2022; U.S. Pat. No. 10,784,532 issued on Sep. 22, 2020; U.S. Pat. No. 11,984,614 issued on May 14, 2024; U.S. Pat. No. 11,958,679 issued on Apr. 16, 2024; PCT/US22/31594 filed on May 31, 2022; PCT/US23/17720 filed on Apr. 6, 2023; PCT/US23/28104 filed on Jul. 19, 2023; PCT/US23/28105 filed on Jul. 19, 2023; PCT/US24/16784 filed on Feb. 21, 2024; PCT/US24/18746 filed on Mar. 6, 2024; PCT/US24/33428 filed on Jun. 11, 2024; PCT/US24/25771 filed on Apr. 23, 2024; PCT/US24/31912 filed on May 31, 2024; U.S. Application 63/534,213 filed on Aug. 22, 2023; U.S. Application 63/418,703 filed on Oct. 24, 2022; PCT/US24/27501 filed on May 2, 2024; PCT/US24/31325 filed on May 29, 2024; PCT/US24/40203 filed on Jul. 30, 2024; U.S. application Ser. No. 18/788,809 filed on Jul. 30, 2024; U.S. application Ser. No. 18/643,134 filed on Apr. 23, 2024; U.S. application Ser. No. 18/807,938 filed on Aug. 17, 2024; U.S. Application 63/684,297 filed on Aug. 16, 2024; U.S. Application 63/700,731 filed on Sep. 29, 2024; U.S. Application 63/700,733 filed on Sep. 29, 2024; U.S. Application 63/703,927 filed on Oct. 5, 2024; U.S. Application 63/703,928 filed on Oct. 5, 2024; U.S. Application 63/704,142 filed on Oct. 7, 2024; U.S. Application 63/753,296 filed on Feb. 3, 2025; U.S. Application 63/753,005 filed on Feb. 3, 2025; U.S. application Ser. No. 19/171,257 filed on Apr. 5, 2025; U.S. application Ser. No. 18/900,338 filed on Sep. 27, 2024; U.S. application Ser. No. 18/920,879 filed on Oct. 19, 2024; U.S. application Ser. No. 18/807,938 filed on Aug. 17, 2024; and U.S. application Ser. No. 18/900,288 filed on Sep. 27, 2024.

FIELD OF THE INVENTION

Embodiments of the invention relate to compositions and to the chemical formulations of electrolytes for use in electrochemical energy devices, such as batteries and electrochemical capacitors.

BACKGROUND OF THE INVENTION

Electrochemical devices, such as batteries or capacitors, employ ionically conducting, electrically insulating electrolytes to carry charge between a negative and positive electrode. These electrolytes are typically liquid at room temperature and atmospheric pressure (293.15 K and 100 kPa, "standard conditions") and consist of an approximately 1.0 M (moles per liter) salt in solvent mixture and optional additives which may be solid, liquid, or gaseous under standard conditions. Salt and solvent molecules exist in so called "solvation shells" where positive and negative ions are typically surrounded by solvent, additive and other positive and negative ions. These solvation shells affect all aspects of the device, from cyclability to safety and depend on concentrations and compositions of the electrolyte formulations. One way in which salt and solvent molecules affect the performance of the device is in their contributions to electrode passivation: some of these molecules decompose on the electrode surface(s) via chemical or electrochemical reaction, and molecules that do so in a way that forms a stable passivation film on one or both electrodes are highly desired when designing electrolytes.

SUMMARY OF THE INVENTION

Disclosed are novel electrolytes based on conductive salt, liquefied gas solvents, and organic liquid solvent additives. The current disclosure describes electrolytes which consist of a solvent which is comprised of one or more solvents, wherein one or more of those solvents are a liquefied gas solvent; and wherein one or more of those solvents is liquid organic ester; a salt or combination of salts; and zero, one, or more additives. The resulting electrolyte mixture is a liquid solution with a room temperature vapor pressure above atmospheric pressure which is maintained by the battery cell housing during normal operation. A battery cell typically consists of two electrodes separated by a separator material either in a planar stack or spiral wound configuration; a liquid electrolyte is traditionally injected and saturates the electrodes and separator material, providing ionic conductivity between the two electrodes necessary for charging and discharging. When a battery cell is filled with the novel electrolytes disclosed herein, the pressurized liquid solution saturates the electrodes and separator materials as in the traditional liquid electrolyte's case. The liquid additive components affect bulk properties of the electrolyte, such as conductivity and viscosity. Organic esters have not been previously disclosed in this role but serve the function of increasing salt solubility while also decreasing the viscosity and improving the conductivity of the resulting liquefied gas electrolyte, which has the potential to offer performance improvements at ultra-low temperatures (<−70° C.). In addition, some electrode passivation mechanisms that are unique to liquefied gas electrolytes are known to exist and improve performance; when certain liquefied gas components are reduced or removed in the electrolyte blend to reduce the cost and/or global warming potential (GWP) of the electrolyte, these beneficial passivation reactions are reduced as well. We disclose herein that organic esters can take the place of certain liquefied gases in this passivation reaction and provide equivalent passivation films (called solid electrolyte interphases or SEI) with lower overall cost and GWP.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention, as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

Figure 1:
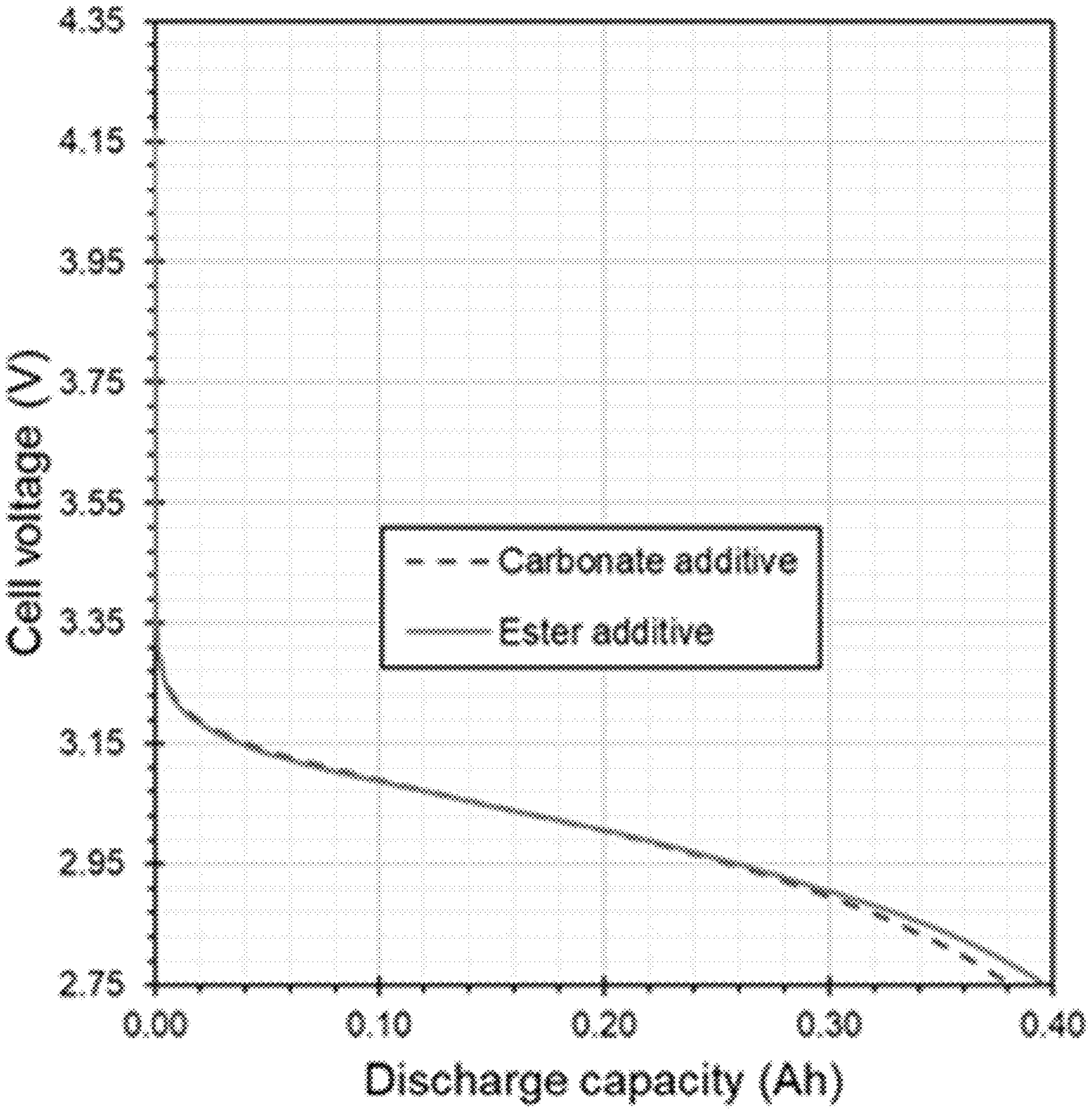
FIG. 1 is a graph of capacity vs. potential of lithium-ion cells with liquefied gas electrolytes with carbonate or esters during discharge at −73° C. at C/50 current rate.

It is known that liquefied gas electrolytes can improve the performance of electrochemical devices through higher power, higher energy, temperature performance, and/or safety. However, in addition to the choice of liquefied gases, the choice of additive can also impact these device characteristics. In liquid electrolytes, organic esters are known to reduce viscosity and improve conductivity at low temperatures when added to organic carbonate-based electrolytes in the range of 10-80% by volume. Both organic carbonate and ester solvents may be added to liquefied gas electrolytes to improve salt solubility and conductivity. When each is added to a liquefied gas electrolyte at approximately 16% by volume, we have demonstrated improved conductivity (see Table 1 below) and low temperature discharge capacity shown in FIG. 1 for the esters.

TABLE 1

Conductivity of liquefied gas electrolytes using various liquid additives.

| Salt + additive | Electrolyte conductivity (mS/cm) | Cell resistance (mΩ) |
|---|---|---|
| LiTFSI + FEC (1:2 mol) | 2.01 | 51 |
| LiTFSI + MA (1:2 mol) | 3.85 | 36 |

LiTFSI = lithium bis(trifluoromethylsulfonyl imide);
FEC = fluoroethylene carbonate;
MA = methyl acetate.

Liquefied gas electrolytes also offer improved performance from electrochemical devices via different electrode passivation (SEI formation) pathways from reactions of liquefied gas components such as methyl fluoride ($CH_3F$). It is well understood that methyl fluoride in contact with lithium metal reacts to form methyllithium ($LiCH_3$, reaction 1) (see Science 2017, 356, 6345, 4263-4272):

$$2Li + CH_3F \longrightarrow LiF + LiCH_3 \qquad (1)$$

It is also reasonable to conclude from literature reports such as J. Am. Chem. Soc. 2015, 137, 46, 14716-14725 that methyllithium reacts with carbon dioxide to form lithium acetate ($CH_3COOLi$, reaction 2):

$$LiCH_3 + CO_2 \longrightarrow CH_3COOLi \qquad (2)$$

Figure 2:
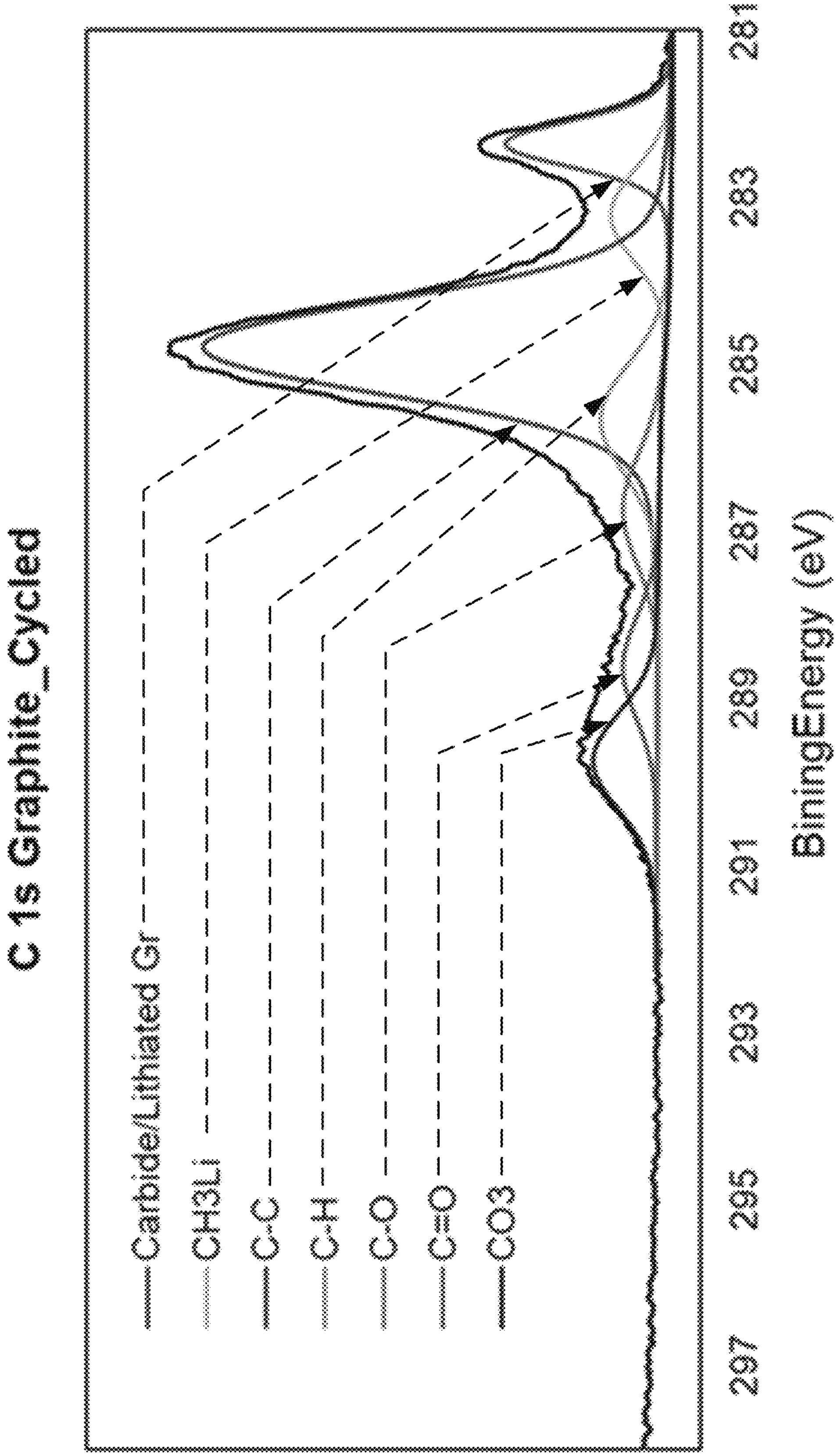
FIG. 2 is an X-ray photoelectron spectrum showing methyllithium on the surface of a cycled graphite anode extracted from a lithium-ion cell that contained a liquefied gas electrolyte including both methyl fluoride and carbon dioxide.

In post-mortem studies of cycled lithium-ion cells containing liquefied gas electrolytes and no lithium metal, evidence of methyllithium was found on the graphite electrode as shown in FIG. 2. It is therefore hypothesized that a similar reaction to (1) takes place between methyl fluoride and lithiated graphite in a charged liquefied gas cell (reaction 3):

$$2LiC_6 + CH_3F \longrightarrow LiF + LiCH_3 + C_6 \qquad (3)$$

Figure 3:
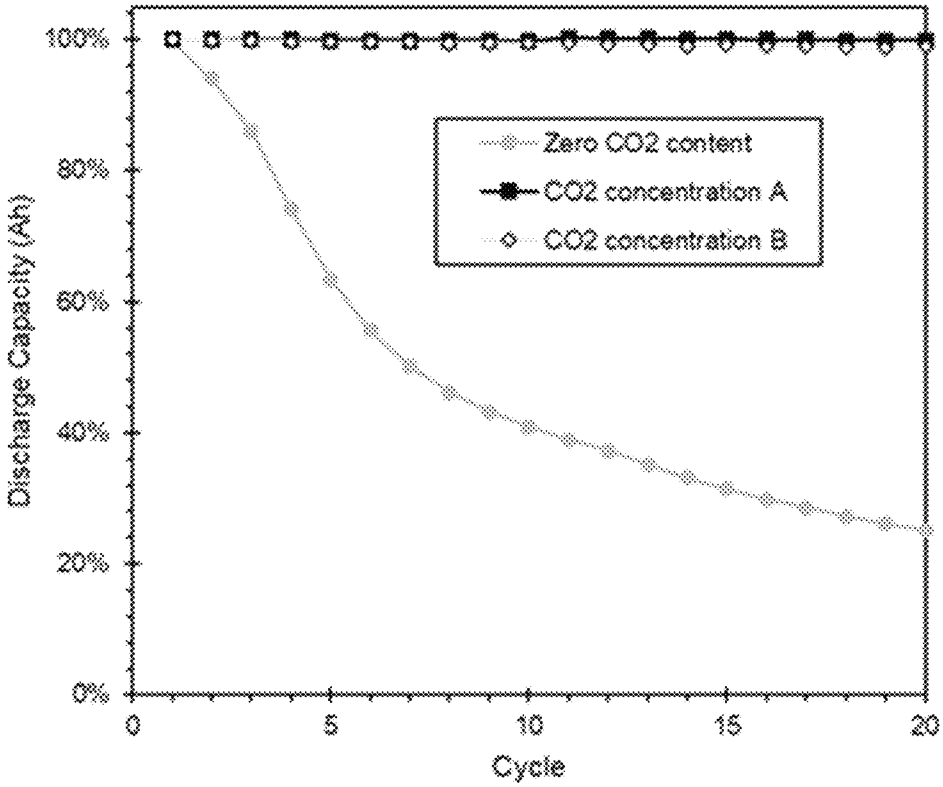
FIG. 3 is a graph of cycle life testing of lithium-ion cells with liquefied gas electrolytes containing methyl fluoride with and without carbon dioxide.

Reaction 2 is therefore believed to follow reaction 3 in a liquefied gas electrolyte cell containing both methyl fluoride and carbon dioxide, forming lithium acetate in the graphite SEI. Studies have shown that the addition of carbon dioxide in small quantities to methyl fluoride containing liquefied gas electrolytes is beneficial to the cycle life of an electrochemical device such as a lithium-ion cell (see FIG. 3). The preceding reaction sequence leading to an SEI with lithium acetate is believed to be responsible for these results. The formation of lithium carboxylate compounds such as lithium acetate in electrode passivation layers is therefore considered to be a desirable outcome. Methyl fluoride in tandem with carbon dioxide are critical components of this process; however, methyl fluoride has a high cost compared to other electrolyte components, carbon dioxide has a high vapor pressure and increases the internal cell pressure, and both contribute to the global warming potential (GWP) of the overall liquefied gas blend. It is highly desired to have a liquefied gas electrolyte that maintains the improved SEI through lithium carboxylate formation described above with reduced cost, pressure, and GWP. Organic esters added to liquefied gas electrolytes can also decompose on the anode, forming lithium carboxylate products such as lithium acetate (reaction 4):

$$RCOOR' + Li^{+} + e^{-} \longrightarrow RCOOLi + R'. \quad (4)$$

Consequently, organic esters are expected to enable the design of new generations of liquefied gas electrolytes with reduced or zero methyl fluoride and/or carbon dioxide content while maintaining or improving performance. This will enable future blends with reduced pressure, reduced cost, and reduced GWP.

Previous disclosures have identified liquid additives being used with liquefied gas electrolytes as helpful in forming SEI for good cycle life, but none of these disclosures speaks to the use of any type of ester as an additive. The use of esters in conventional liquid electrolyte as an SEI former is not common or well documented. It is known that the liquefied gas electrolyte, through the combination of methyl fluoride and carbon dioxide, can form a stable SEI. This is further unique to the liquefied gas electrolyte since only SEI components which are non-soluble in the electrolyte will form a stable SEI. Through careful characterization and experimentation it was discovered that lithium acetate has little solubility in the liquefied gas solvent and can form an SEI with high ionic conductivity and is electrically isolating. With the discovery disclosed here as to the unique mechanism by which this happens (the formation of lithium acetate), the use of esters may be considered novel and non-obvious.

The esters have the added benefit of increasing the solubility of the lithium salt within the liquefied gas solvent. The ester may thus be used in quantities needed to solubilize the salt and form appropriate SEI layers. The ratio of ester to the electrolyte may be 0.1, 0.3, 0.5, 0.8, 1.0, 1.2, 1.5, 1.8, 2.0, 2.1, 2.2, 2.5, 3.0 by mole to maximize the solubility of salt and performance (stability) of the SEI. The overall molar content of the ester ratio in the electrolyte may range from 0.01 to 25M. Too much excess ester may lower the electrochemical stability of the cell and increase the viscosity of the electrolyte and/or lead to phase separation of the liquefied gas electrolyte. One embodiment is an electrochemical device comprising an ionically conducting electrolyte. The ionically conducting electrolyte may comprise one or more salts, one or more liquefied gas solvents, and one or more gas, liquid, or solid esters. The one or more salts may be liquid, solid, or gas at a standard room temperature of 293.15K and at a standard pressure (approximately 100 kPa). The liquefied gas solvent is gaseous at a standard room temperature of 293.15K and at a standard pressure (approximately 100 kPa). The esters may be gaseous, liquid, or solid at a standard room temperature of 293.15K and at a standard pressure (approximately 100 kPa). The salt is soluble in the liquefied gas solvent and the ester is also soluble in the liquefied gas solvent such that the ionically conducting electrolyte is a liquid under pressure. A first electrode and second electrode may be placed in contact with the ionically conducting electrolyte, and a housing may enclose the ionically conducting electrolyte, the first electrode and the second electrode. The housing is of sufficient strength to keep the ionically conducting electrolyte under pressure and in a liquid state.

One of skill in the art will understand that the terms “one or more salts,” “one or more solvents” (including “liquefied gas solvents” and “solid solvents”), and “one or more additives,” as used herein in connection with “the ionically conducting electrolytes,” refer to one or a plurality of electrolyte components.

Figure 4:
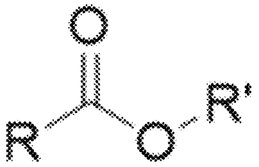
FIG. 4 illustrates the potential esters described in this invention.
Figure 4:
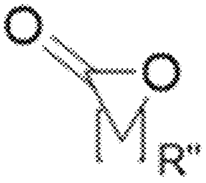

In some embodiments, the liquefied gas electrolyte is further comprised of an ester such as methyl formate, methyl acetate, methyl propionate, methyl butyrate, ethyl formate, ethyl acetate, ethyl propionate, ethyl butyrate, propyl formate, propyl acetate, propyl propionate, propyl butyrate, trifluoromethyl formate, trifluoromethyl fluoroformate, 2,2,2-trifluoroethyl formate, 2,2,2-trifluoroethyl acetate, ethyl trifluoroacetate, 2,2,2-trifluoroethyl trifluoroacetate, 2,2,2-trifluoroethyl butyrate, acetolactone, α-propiolactone, α-butyrolactone, α-valerolactone, α-caprolactone, α-heptalactone, α-octalactone, β-propiolactone, β-butyrolactone, β-valerolactone, β-caprolactone, β-heptalactone, β-octalactone, γ-butyrolactone, γ-valerolactone, γ-caprolactone, γ-heptalactone, γ-octalactone, δ-valerolactone, δ-caprolactone, δ-heptalactone, δ-octalactone, ε-caprolactone, ε-heptalactone, ε-octalactone, or any combination thereof. FIG. 4 illustrates the potential esters described in this invention.

In an exemplary electrochemical device, the electrodes are composed of any combination of two electrodes of intercalation type such as graphite, carbon, activated carbon, vanadium oxide, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide, carbon, or chemical reaction electrode such as with chemicals of sulfur, oxygen, carbon dioxide, nitrogen, nitrous oxide, sulfur dioxide, thionyl fluoride, thionyl chloride fluoride, sulfuryl fluoride, sulfuryl chloride fluoride or of a metallic electrode with lithium, sodium, magnesium, tin, aluminum, calcium, titanium, zinc metal or metal alloy including lithium, sodium, tin, magnesium, aluminum, calcium, titanium, zinc, or any combination thereof. These components may be combined with various binder polymer components, including polyvinylidene fluoride, carboxymethyl cellulose, styrene-butadiene rubber, or polytetrafluoroethylene to maintain structural integrity of the electrode.

In some embodiments, the liquefied gas electrolyte may comprise in part of dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, 3,3,3-trifluoropropene, 2,3,3,3-tetrafluoropropene, trans-1,3,3,3-tetrafluoropropene, trans-1,1,1,4,4,4-hexafluoro-2-butene, cis-1,1,1,4,4,4-hexafluoro-2-butene, 1,1-difluoroethene, 1,2-difluoroethene, 1,1-dichloroethene, vinyl chloride, vinyl fluoride, hexafluoropropene, hexafluorobutadiene, trichloroethene, dichloroethene, chlorofluoroethene, (Z)-1-chloro-2,3,3,3,-tetrafluoropropene, trans-1-chloro-3,3,3-trifluoropropene, 3,3,4,4,4-pentafluoro-1-butene, hydrofluoroolefins (HFOs), hydrochloroolefins (HCOs), hydrochlorofluoroolefins (HCFOs), perfluoroolefins (PFOs), or perchloroolefins (PCOs), perfluoroolefins, methane, ethane, propane, n-butane, iso-butane, cyclopropane, cyclopropane, ethene, propene, butene, cyclobutane, cyclobutene, acetylene, pentane, hexane, heptane, octane, cyclopentane, cyclohexane, cycloheptane, cyclooctane, isomers thereof, or a combination thereof.

In some embodiments, lithium-, sodium-, zinc-, calcium-, magnesium-, aluminum-, or titanium-based salts are used. Further, electrolyte or solvent solution containing one or more liquefied gas solvents may be combined with one or more salts, including one or more of lithium bis(trifluoromethanesulfonyl)imide (LiTFSI), lithium hexafluorophosphate (LiPF6), lithium perchlorate (LiClO4), lithium hexafluoroarsenate (LiAsF6), lithium tetrachloroaluminate (LiAlCl4), lithium tetragalliumaluminate, lithium bis(oxalato)borate (LiBOB), lithium hexafluorostannate (LiSnF4), lithium difluoro (oxalato)borate (LiDFOB), lithium bis(fluorosulfonyl)imide (LiFSI), lithium aluminum fluoride (LiAlF3), lithium nitrate (LiNO3), lithium trifluoromethanesulfonate, lithium tetrafluoroborate (LiBF4), lithium difluorophosphate, lithium tetrafluoro(oxalato)phosphate, lithium difluorobis(oxalato)phosphate, lithium borate, lithium oxalate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, dilithium squarate, lithium croconate dihydrate, dilithium rhodizonate, dilithium ketomalonate, lithium diketosuccinate or any corresponding salts with a positively charged sodium or magnesium cation substituted for the lithium cation, or any combinations thereof. Further useful salts include those with positively charged cations such as tetramethylammonium, tetraethylammonium, tetrapropylammonium, tetrabutylammonium, triethylmethylammonium, spiro-(1,1')-bipyrrolidinium, 1,1-dimethylpyrrolidinium, and 1,1-diethylpyrrolidinium, N,N-diethyl-N-methyl-N(2-methoxyethyl)ammonium, N,N-Diethyl-N-methyl-N-propylammonium, N,N-dimethyl-N-ethyl-N-(3-methoxypropyl)ammonium, N,N-Dimethyl-N-ethyl-N-benzylAmmonium, N,N-Dimethyl-N-ethyl-N-phenylethylammonium, N-Ethyl-N,N-dimethyl-N-(2-methoxyethyl)ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalato)borate, bis(trifluoromethanesulfonyl) imide, bromide, chloride, dicyanamide, diethyl phosphate, hexafluorophosphate, hydrogen sulfate, iodide, methanesulfonate, methyl-phosphonate, tetrachloroaluminate, tetrafluoroborate, and trifluoromethanesulfonate. Alternative or additional embodiments described herein provide an electrolyte composition comprising one or more of the features of the foregoing description or of any description elsewhere herein.

In some embodiments the liquefied gas electrolyte may comprise an additive such as a non-cyclic carbonate, cyclic carbonate, ether, cyclic-ether, nitrile, or an organophosphate containing compound. These additives may include dimethyl carbonate, ethyl methyl carbonate, propyl methyl carbonate, butyl methyl carbonate, diethyl carbonate, propyl ethyl carbonate, butyl ethyl carbonate, dipropyl carbonate, butyl carbonate, dibutyl carbonate, fluoromethyl methyl carbonate, difluoromethyl methyl carbonate, trifluoromethyl methyl carbonate, bis(fluoromethyl)carbonate, bis(difluoromethyl)carbonate, bis(trifluoromethyl)carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethyl ethyl carbonate, bis(fluoroethyl)carbonate, bis(difluoroethyl)carbonate, bis(trifluoroethyl)carbonate, bis(tetrafluoroethyl)carbonate, bis(pentafluoroethyl) carbonate, bis(hexafluoroethyl)carbonate, vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis(fluoromethyl)ethylene carbonate, bis (difluoromethyl)ethylene carbonate, bis(trifluoromethyl) ethylene carbonate, methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2,2-Tetrafluoro-3-(1,1,2,2-tetrafluoroethoxy)-propane, trifluoro(trifluoromethoxy)methane, perfluoroethyl ether, fluoromethyl methyl ether, difluoromethyl methyl ether, trifluoromethyl methyl ether, bis(fluoromethyl) ether, bis (difluoromethyl) ether, fluoroethyl methyl ether, difluoroethyl methyl ether, trifluoroethyl methyl ether, bis(fluoroethyl) ether, bis(difluoroethyl) ether, bis(trifluoroethyl) ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, methyl nonafluorobutyl ether, ethyl nonafluorobutyl ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, bis(trifluoro)methyl ether, dimethylether, methyl ethyl ether, methyl vinyl ether, perfluoromethyl-vinylether, propylene oxide, tetrahydrofuran, tetrahydropyran, furan, 12-crown-4, 15-crown-5, 18-crown-6, 2-Methyltetrahydrofuran, 1,3-Dioxolane, 1,4-dioxolane, 2-methyloxolane, (1,2-propylene oxide), ethylene oxide, octafluorotetrahydrofuran, acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, trimethylphosphate, triethylphosphate, isomers thereof, and any combination thereof.

While this document contains many specifics, these should not be construed as limitations on the scope of any invention or of what may be claimed, but rather as descriptions of features that may be specific to a particular embodiment of the invention. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination.

The invention claimed is:

1. An electrochemical device, comprising:

an ionically conducting electrolyte comprising a liquefied gas solvent, an organic liquid ester, and a salt, wherein:
  the liquefied gas solvent has a vapor pressure above 100 kPa at a temperature of 293.15K;
  the salt is soluble in the liquefied gas solvent; and
  the organic liquid ester is soluble in the liquefied gas solvent such that the ionically conducting electrolyte is a liquid under pressure;

a first electrode and a second electrode in contact with the ionically conducting electrolyte;

a housing that encloses the ionically conducting electrolyte, the first electrode and the second electrode, and maintains the electrolyte under sufficient pressure to keep the liquefied gas solvent in a liquid state at room temperature during normal operation, wherein the housing is a sealed cell housing that does not include a gas inlet or a gas outlet configured for continuous purging of gaseous reactants during normal operation of the electrochemical device; and wherein the liquid organic ester is configured to increase the solubility of the salt in the electrolyte, to decrease the viscosity of the electrolyte, to improve the ionic conductivity of the electrolyte, and to participate in the formation of a stable solid electrolyte interphase film on a surface of at least one of the first electrode or the second electrode.

2. The electrochemical device of claim 1, wherein the molar concentration of the salt in the ionically conducting electrolyte ranges from about 0.01 to about 25 M.

3. The electrochemical device of claim 1, wherein the salt is selected from a group consisting of: LiTFSI, LiFSI, $LiPF_6$, LiBOB, $LiBF_4$, LiDFOB, $LiNO_3$, and combinations thereof.

4. The electrochemical device of claim 1, wherein the liquefied gas solvent is selected from a group consisting of: dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, difluoro ethylene, nitrous oxide, nitrogen dioxide, nitrogen oxide, carbon disulfide, hydrogen fluoride, hydrogen chloride and combinations thereof.

5. The electrochemical device of claim 1, wherein the organic liquid ester is selected from a group consisting of: methyl formate, methyl acetate, methyl propionate, methyl butyrate, ethyl formate, ethyl acetate, ethyl propionate, ethyl butyrate, propyl formate, propyl acetate, propyl propionate, propyl butyrate, trifluoromethyl formate, trifluoromethyl fluoroformate, 2,2,2-trifluoroethyl formate, 2,2,2-trifluoroethyl acetate, ethyl trifluoroacetate, 2,2,2-trifluoroethyl trifluoroacetate, 2,2,2-trifluoroethyl butyrate, acetolactone, α-propiolactone, α-butyrolactone, α-valerolactone, α-caprolactone, α-heptalactone, α-octalactone, β-propiolactone, β-butyrolactone, β-valerolactone, β-caprolactone, β-heptalactone, β-octalactone, γ-butyrolactone, γ-valerolactone, γ-caprolactone, γ-heptalactone, γ-octalactone, δ-valerolactone, δ-caprolactone, δ-heptalactone, δ-octalactone, ε-caprolactone, ε-heptalactone, ε-octalactone, and combinations thereof.

6. The electrochemical device of claim 1, wherein the first electrode and the second electrode are selected from a group consisting of: graphite, carbon, activated carbon, vanadium oxide, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, and lithium nickel cobalt aluminum oxide.

7. The electrochemical device of claim 1, wherein the first electrode is selected from a group consisting of: lithium metal, sodium metal, calcium metal, magnesium metal, aluminum metal, zinc metal, and combinations thereof.

8. The electrochemical device of claim 1, wherein the ionically conducting electrolyte further comprises an additive selected from a group consisting of: a non-cyclic carbonate, cyclic carbonate, ether, cyclic-ether, nitrile, an organophosphate, and combinations thereof.

9. The electrochemical device of claim 1, wherein the electrochemical device is a battery or a capacitor.

10. The electrochemical device of claim 1, wherein the SEI comprises lithium acetate that is formed by reductive decomposition of the organic liquid ester during cell formation or initial charging and is non-soluble in the liquefied gas solvent.

* * * * *